(12) United States Patent
Gupta et al.

(10) Patent No.: US 9,948,823 B2
(45) Date of Patent: *Apr. 17, 2018

(54) DEVICE DISCOVERY USING BROADCAST TECHNOLOGY

(71) Applicant: Electronics for Imaging, Inc., Fremont, CA (US)

(72) Inventors: Vinod Gupta, Union City, CA (US); Haresh Joshi, Foster City, CA (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,555

(22) Filed: Mar. 21, 2016

(65) Prior Publication Data

US 2017/0078523 A1  Mar. 16, 2017

Related U.S. Application Data

(63) Continuation of application No. 13/612,353, filed on Sep. 12, 2012, now Pat. No. 9,294,574.

(51) Int. Cl.
*H04N 1/327* (2006.01)
*H04L 29/08* (2006.01)
(Continued)

(52) U.S. Cl.
CPC ......... *H04N 1/32789* (2013.01); *H04L 29/08* (2013.01); *H04L 29/12* (2013.01);
(Continued)

(58) Field of Classification Search
CPC .... H04B 13/00; H04B 17/00; H04B 17/0082; H04B 2203/5404–2203/5408; H04L 7/00; H04L 7/0004; H04L 7/0079; H04L 4145/00; H04L 7/02; H04L 7/24–7/26; H04L 4161/10; H04L 7/30; H04L 65/00; H04L 65/10; H04L 65/1003; H04L 4167/00; H04L 65/14–65/142; H04L 65/16; H04L 65/30; H04L 65/303;
(Continued)

(56) References Cited

U.S. PATENT DOCUMENTS 5,227,778 A   7/1993  Vacon et al.
5,278,829 A   1/1994  Dunlap
(Continued)

*Primary Examiner* — Tauqir Hussain
*Assistant Examiner* — Boris Grijalva Lobos
(74) *Attorney, Agent, or Firm* — Perkins Coie LLP

(57) ABSTRACT

Techniques described herein automatically discover the IP address of a first network device such as but not limited to a multifunction printer. Such techniques use a unique identifier of the first network device, such as for example a multifunction printer serial number. Such unique number is used in the configuration of a second network device, such as for example a Digital Front End/External Print Controller that may need the IP address of the first network device. The unique number may be entered once into the second network device or may be received from the first network device through a data interface by the second network device. Techniques then may use any available broadcast technology such as but not limited to Simple Network Management Protocol (SNMP) to determine from available network devices which network device therefrom has the same unique number, thereby obtaining the IP address of the first network device.

20 Claims, 4 Drawing Sheets

(51) Int. Cl.
*H04L 12/24* (2006.01)
*H04L 29/12* (2006.01)
*H04N 1/32* (2006.01)

(52) U.S. Cl.
CPC .......... *H04L 41/12* (2013.01); *H04L 61/2007* (2013.01); *H04L 67/16* (2013.01); *H04N 1/32101* (2013.01); *H04N 2201/0039* (2013.01); *H04N 2201/0094* (2013.01); *H04N 2201/3205* (2013.01); *H04N 2201/3208* (2013.01)

(58) Field of Classification Search
CPC . H04L 4129/08; H04L 65/12; H04N 1/32789; H04N 2201/0039; H04N 1/0094; H04N 1/3205; H04N 1/3208
See application file for complete search history.

(56) References Cited

U.S. PATENT DOCUMENTS

| | | |
|---|---|---|
| 5,282,270 A | 1/1994 | Oppenheimer et al. |
| 5,898,823 A | 4/1999 | Sorkin et al. |
| 6,496,859 B2 | 12/2002 | Roy et al. |
| 6,574,664 B1 | 6/2003 | Liu et al. |
| 6,701,361 B1 | 3/2004 | Meier et al. |
| 6,982,953 B1 | 1/2006 | Swales |
| 7,072,987 B2 | 7/2006 | Jurisch et al. |
| 7,203,750 B1 | 4/2007 | Kracht et al. |
| 7,340,538 B2 | 3/2008 | Alappat et al. |
| 7,436,533 B2 | 10/2008 | Heiney et al. |
| 7,640,327 B2 | 12/2009 | Humpleman et al. |
| 7,886,149 B2 | 2/2011 | Schnizlein et al. |
| 7,979,534 B2 | 7/2011 | Nuggehalli et al. |
| 8,484,332 B2 | 7/2013 | Bush et al. |
| 8,504,672 B2 | 8/2013 | Schmidt et al. |
| 2002/0062366 A1 | 5/2002 | Roy et al. |
| 2005/0198267 A1 | 9/2005 | Parks et al. |
| 2006/0031488 A1 | 2/2006 | Swales et al. |
| 2006/0142005 A1 | 6/2006 | Takaluoma et al. |
| 2006/0159032 A1 | 7/2006 | Ukrainetz et al. |
| 2007/0285704 A1 | 12/2007 | Wu |
| 2010/0103824 A1 | 4/2010 | Gilmour et al. |
| 2010/0146104 A1 | 6/2010 | Chen et al. |
| 2010/0250738 A1 | 9/2010 | Nagatani et al. |
| 2013/0275574 A1 | 10/2013 | Hugard, IV et al. |

(DIRECT NETWORK CONNECTION - PRIOR ART)

(NETWORK CONNECTION MODE - PRIOR ART)

DEVICE DISCOVERY USING BROADCAST TECHNOLOGY

CROSS REFERENCE TO RELATED APPLICATIONS

This application is a continuation of U.S. patent application Ser. No. 13/612,353, filed Sep. 12, 2012, which is incorporated herein in its entirety by this reference thereto.

BACKGROUND OF THE INVENTION

Technical Field

This invention relates generally to the field of device discovery in a network environment. More specifically, this invention relates to the automatic IP configuration of any device on a network by leveraging a known, other interface.

Description of the Related Art

A Digital Front End/External Print Controller, referred to herein simply as a "DFE," is a network device which manages a multifunction printer. Such DFE exposes various services of the multifunction printer to a public network. Typically, multifunction printers today connect to a DFE with an interface for data communication and connect with a network interface for other services such as scanning, SNMP, etc. For purposes of discussion herein, a multifunction printer is a printer that provides services beyond printing, such as but not limited to scanning, photocopying, faxing, and so on. Presently, to provide such services that are in addition to printing services, a DFE needs to know the Internet Protocol (IP) address of the multifunction printer.

It should be appreciated that the above described scenario need not be limited to a DFE needing to know the IP address of a connected multifunction printer. Indeed, it is contemplated that any network device may need to know the IP address of any other device with which the network device is already in communication.

A network printer auto-detection technique is disclosed in U.S. Pat. No. 5,898,823, filed May 8, 1997 to M. A. Sorkin, G. Welker, S. H. Beckstead, T. Shaffar, and M. P. Murphy. According to such technique, the network address of the printer is automatically detected by a method and a system in which a non-print job, which includes a job header identifying the sending computer, is generated by the computer and transmitted via a spooler to the printer. The printer responds by transmitting an acknowledgment which includes the network address of the printer, to the sending computer. The sending computer identifies and stores the printer address therein. Thereafter, the printer address stored at the computer can be used to provide direct communications with the printer, for purposes of certain printer related functions such as determining the printer configuration or set-up, or monitoring the printer.

Further, in U.S. Pat. No. 5,282,270 filed Jun. 6, 1990 to A. B. Oppenheimer, S. J. Findley, and G. Sidhu, a method and apparatus for determining whether an alias is available to uniquely identify an entity in a communications system is discussed. A technique for determining the location of an entity using an alias or entity name in a communication system is discussed. A second node or entity transmits a first signal to a first router connected to a first local network of the communication system including the alias, wherein the alias includes a zone name. The first router forwards a second signal including the entity name from the first signal to other routers in the network until a second router connected to nodes having the zone name in the entity name is located. Each second router translates the second signal into a third signal which includes the alias, and using a first zone multicast address, multicasts the third signal to a first set of nodes. Each node of the first set of nodes determines whether the zone name contained within the alias is equal to a zone identifier for each node of the first set of nodes. Each node having the zone name determines whether the alias contained within the third signal is equal to alias information for the node. A first entity having the alias then transmits a fourth signal, which includes its network address, to the second entity in response to the third signal.

Further, in U.S. Pat. No. 5,278,829, filed Jan. 10, 1991 to K. J. Dunlap, a protocol is provided in which a sending host stores a physical address of a target host as part of the resolution of the physical address from a network address; the sending host keeps track of the elapsed time after physical address storage; upon a subsequent usage of the stored physical address, the sending host tests for the validity of the stored physical address; if the stored physical address is still valid, the sending host can use it to transmit data to the target host; if the stored physical address is no longer valid, then the sending host transmits a broadcast packet onto the network to resolve the physical address of the target host.

Further, in U.S. Pat. No. 5,227,778, filed Apr. 5, 1991 to G. V. Vacon and J. A. Visser, a data communications network having a number of servers and a number of service providers is disclosed to employ an improved protocol for translating service names to network addresses. A server sends a multi-cast message to all service providers requesting a service needed by one of the user terminals connected to this server. In the request, the service is identified by function, rather than by address. Any node which provides this service, receiving the request and able to reply, sends a reply message immediately to the server. The reply message identifies the node, such as a service provider, by network address such that a transaction with this provider can be initiated by the server immediately. If the service provider cannot reply, a third party node can send a reply to identify the provider by address. If the server does not receive a reply from the provider or a third party, then a cache of network addresses of services most recently used by the server is searched for this particular service. The cache may include a separate local cache for each user terminal connected to this server, with each local cache containing the service and address for the last-used service for one of the user terminals. In addition, a secondary cache is maintained for all items replaced in the local caches when they are updated. When the cache is searched both local and secondary, if the service address is found, a transaction is begun immediately by the server to utilize the service. If not found in the cache, the server waits for a service advertisement to appear on the network, and obtains the network address of the provider from the advertisement.

SUMMARY OF THE INVENTION

Embodiments described herein include techniques to automatically discover the IP address of a first network device such as but not limited to a multifunction printer. Such techniques use a unique identifier of the first network device, such as for example a multifunction printer serial number. Such unique number is used in the configuration of a second network device, such as for example a DFE, that may need the IP address of the first network device. The unique number may be entered once into the second network device or may be received from the first network device through a data interface by the second network device.

Techniques then may use any available broadcast technology such as but not limited to Simple Network Management Protocol (SNMP) to determine from available network devices which network device therefrom has the same unique number, thereby obtaining the IP address of the first network device.

In accordance with an embodiment, it should be appreciated that for the new proposed method to work automatically, the first network device needs to provide its unique identifier to the second network device with a data interface other than the IP network interface. As well, such unique identifier also should be made available through the available broadcast technology. The embodiment then uses a broadcast packet to determine the IP address of the first network device dynamically each time the data interface is connected.

DETAILED DESCRIPTION OF THE INVENTION

Figure 1:
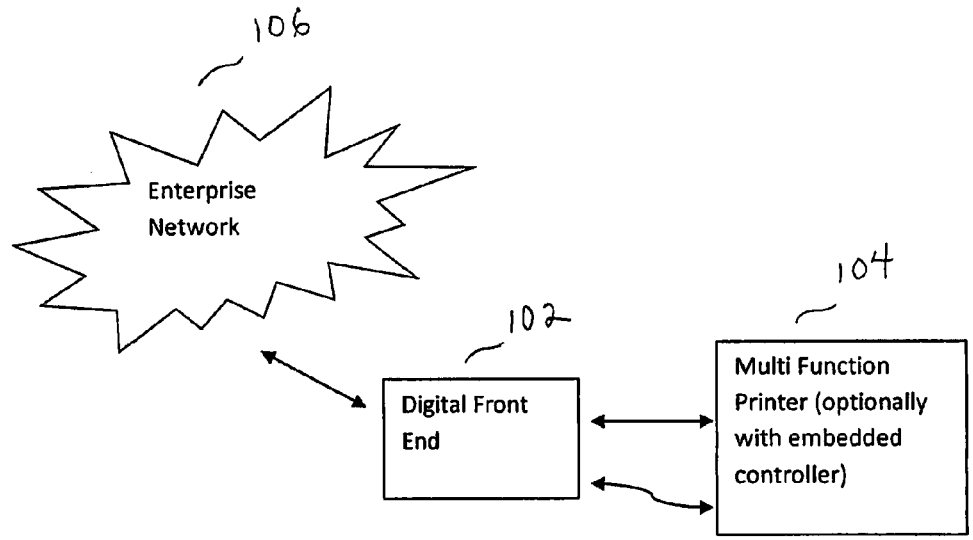
FIG. 1 is a schematic diagram showing a direct network connection, according to the prior art.

Embodiments described herein include techniques to automatically discover the IP address of a first network device such as but not limited to a multifunction printer. Such techniques use a unique identifier of the first network device, such as for example a multifunction printer serial number. Such unique number is used in the configuration of a second network device, such as for example a DFE, that may need the IP address of the first network device. The unique number may be entered once into the second network device or may be received from the first network device through a data interface by the second network device. Techniques then may use any available broadcast technology such as but not limited to Simple Network Management Protocol (SNMP) to determine from available network devices which network device therefrom has the same unique number, thereby obtaining the IP address of the first network device.

In accordance with an embodiment, it should be appreciated that for the new proposed method to work automatically, the first network device provides its unique identifier to the second network device with a data interface other than the IP network interface. As well, such unique identifier may also be made available through the available broadcast technology. The embodiment then uses a broadcast packet to determine the IP address of the first network device dynamically each time the data interface is connected.

It should further be appreciated that while particular details about a first network device being a multifunction printer and a second network device being a DFE are discussed herein, such details are by way of example only and are not meant to be limiting. For example, other implementations may use other technologies, such as but not limited to a digital printing press, a laptop, a digital projector, and a streaming video player, e.g. Blu-ray Disc™ player, some of which are discussed hereinbelow to illustrate the various uses of the embodiments. Examples of unique identifiers may include but are not limited to a serial number, a combination of a serial number and make/model, and a MAC address. Examples of such interfaces may include but are not limited to a proprietary interface, an open interface, a data interface, an HDMI cable, a high-speed serial cable, and a printer cable. Examples of broadcast technology may include but are not limited to simple network management protocol (SNMP); Web Services on Devices (WSD) discovery, and any proprietary discovery protocol which responds with the unique identifier. One skilled in the art would readily recognize that embodiments herein are not limited to such printer technologies but are applicable to any type of network devices and any type of broadcast technology.

Current Process

A current process for obtaining an IP address of a network device is discussed as follows, using printer technology for illustrative purposes only. Thus, as discussed above, currently a DFE is a network device which manages a multi-function printer and exposes various services to public network. Most of the multifunction printers today connect to a DFE with an interface for data communication and with a network interface for other services such as scanning, SNMP, etc. Today a DFE needs to know the IP address of the multifunction printer to provide such network services such as scanning, SNMP, etc., to network clients.

Presently, obtaining the IP address is performed in two ways, in no particular order:
  Adding a manual step of entering the IP address of the multifunction printer in the DFE configuration.
  A variant of the above approach is to connect the DFE and multifunction printer in a closed network with a fixed IP first such that the DFE can store the MAC address of the multifunction printer. Then, the DFE can dynamically find the multifunction printer on the network using such MAC address.

Problems with Current Process

It should be appreciated that the current processes for one network device to obtain the IP address of the second network device, such as described above, may be problematic. For example and referring to FIG. 1, the multifunction printer and the DFE may be connected as follows:
  Direct Connection Mode: According to this approach, DFE 102 acts as gateway for all the network traffic going from an enterprise network 106 to a multifunction printer with an embedded network controller 104. This method of connecting DFE 102 and multifunction printer 104 as shown in FIG. 1 may be efficient for enterprises as the information technology (IT) team may need to manage one IP address of DFE 102. However, in this approach there exists a problem where some of the network services running on the embedded network controller in multifunction printer 104 cannot be used. For example, some network services may be redundantly exposed by DFE 102 and multifunction printer 104, thus such services may not be available to enterprise network 106. In some cases multifunction printer 104 may use a proprietary protocol which uses the interface IP address in the packets which cannot be changed by the forwarding mechanism built in DFE 102.

Figure 2:
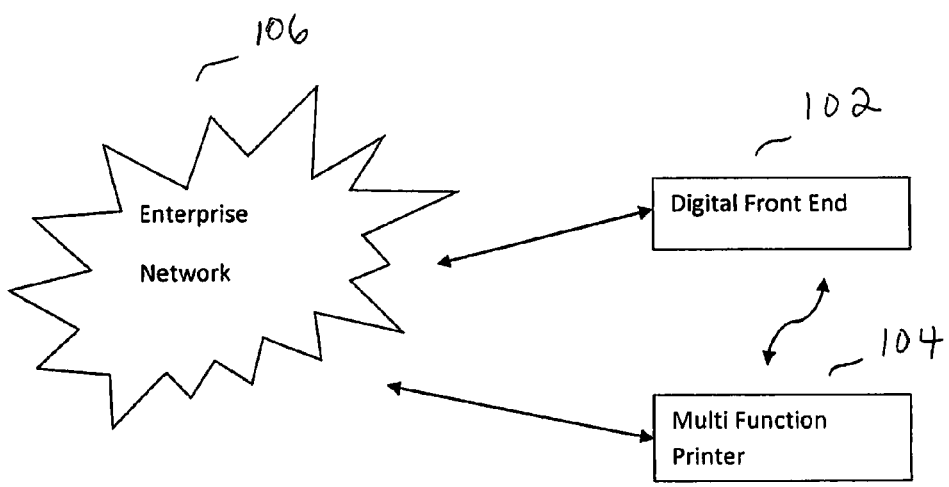
FIG. 2 is a schematic diagram showing a network connection mode, according to the prior art.

It should be appreciated that the above problem may be overcome when DFE 102 is connected in the following configuration and with reference to FIG. 2:

Network Connection Mode: In this approach, DFE 102 and multifunction printer 104 are both connected to enterprise network 106.

This method may allow both DFE 102 and multifunction printer 104 to expose their respective network services to enterprise network 106. However, some downsides of this approach are:

The IT team needs to manage 2 IP addresses.

DFE 102 may need to know the IP address of multifunction printer 104 to support some important functions such as scanning, SNMP, etc.

Further, two possible approaches to uniquely identify multifunction printer 104 may include in no particular order:

Using a tool to specify the IP address of multifunction printer 104: The first approach of entering the multifunction printer IP in a configuration may have a problem where the DFE configuration needs to be changed whenever the IP lease of the multifunction printer expires which may add to management cost.

Using MAC address: Such approach may be possible in two ways:

Using a tool to specify the MAC address of multifunction printer 104; and

Connecting multifunction printer 104 and DFE 102 in direct connection mode, such that DFE 102 may store the MAC address of multifunction printer 104 and then, subsequently, connect both such devices in network mode.

The second approach of connecting two devices in a closed network is time consuming as the user first needs to assign a particular IP to the multifunction printer, connect both the machines in closed network, and then move the machines to the actual network. Such process may be a complicated process and not user friendly for the end user.

Currently, a user is faced with the above-described choices of how to configure their devices. Then once a decision is made, such users may have to go through an elaborate process of connecting cables in a certain way, going through some applications and, setting up the IP addresses of the DNS name and so forth before such users arrive at a point where everything is set up.

Thus, it should be appreciated that some embodiments herein address the second problem about the requirement of DFE 102 to know the IP address of multifunction printer 104.

Leveraging an Interface

Thus, embodiments herein address the above-described problems by leveraging existing entities. More specifically, in an environment where there are different interfaces to different network devices, embodiments herein leverage one interface to automatically configure another interface, and so forth.

As well, embodiments herein may leverage a secondary channel, such as but not limited to a physical cable, a mechanism that determines proximity, a wireless connection that allows exchanging data over short distances (e.g. Bluetooth®), an infrared connection, etc.

As an example, embodiments disclosed herein may allow DFE 102 to determine the IP address of multifunction printer 104 dynamically without any manual intervention leveraging, e.g. using, another available interface, such as but not limited to a data interface. It should be appreciated that embodiments herein may save management costs as an end user may connect DFE 102 and multifunction printer 104 in any network configuration.

Discovering a Device Uniquely

Following is a high level description of steps for a first network device, e.g. DFE 102 to discover a second network device, e.g. multifunction printer 104, in accordance with an embodiment. It should be appreciated that the particular details about printer technology are for illustrative purposes only and are not meant to be limiting. Indeed, the following applies to any two network devices that are in communication over a first interface and are each adapted to be in communication with an enterprise network, such as the Internet, Intranet, and so on.

Thus, in an embodiment, steps to discover multifunction printer (MFP) 104 uniquely may include but are not limited to the steps as follows:

1) MFP provides a unique identifier through the data interface.

Figure 3:
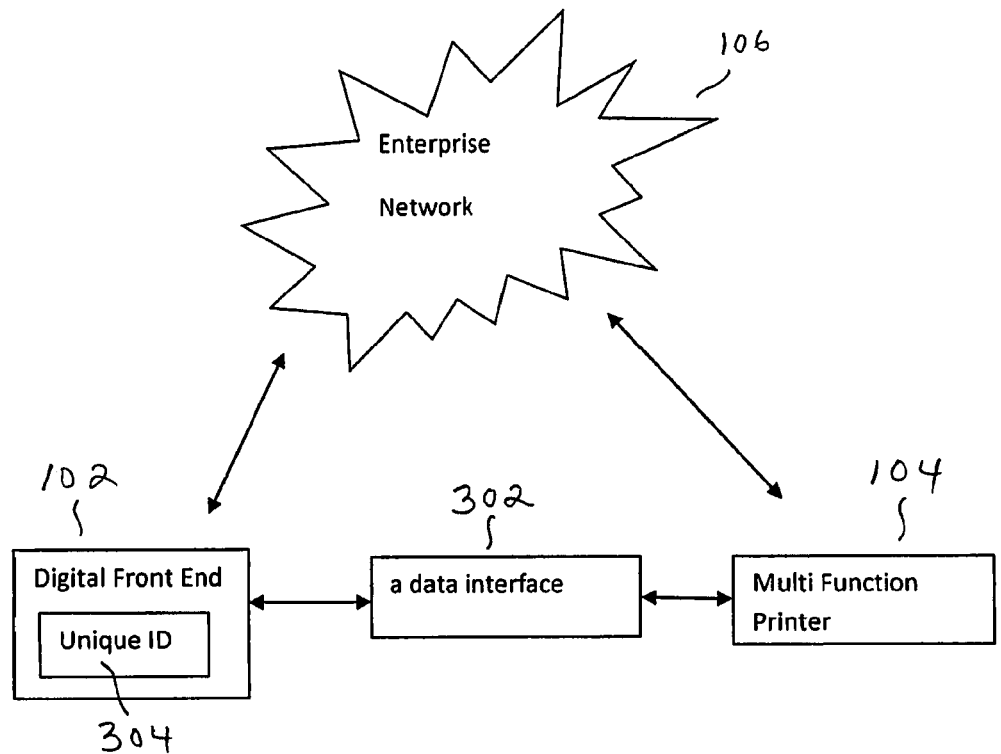
FIG. 3 is a schematic diagram showing a multi-function printer providing a unique identifier through a data interface to a digital front end, according to an embodiment.

That is, referring to FIG. 3, MFP 104 provides a unique identifier 304 through a data interface 302 to DFE 102. DFE 102 subsequently stores the unique identifier 304.

2) Subsequently, to discover multifunction printer 104 on the network, DFE 102 sends a broadcast message to enterprise network 106 for discovery of unique identifier 304 using broadcast technology that is based on the network management service of enterprise network 106.

Figure 4:
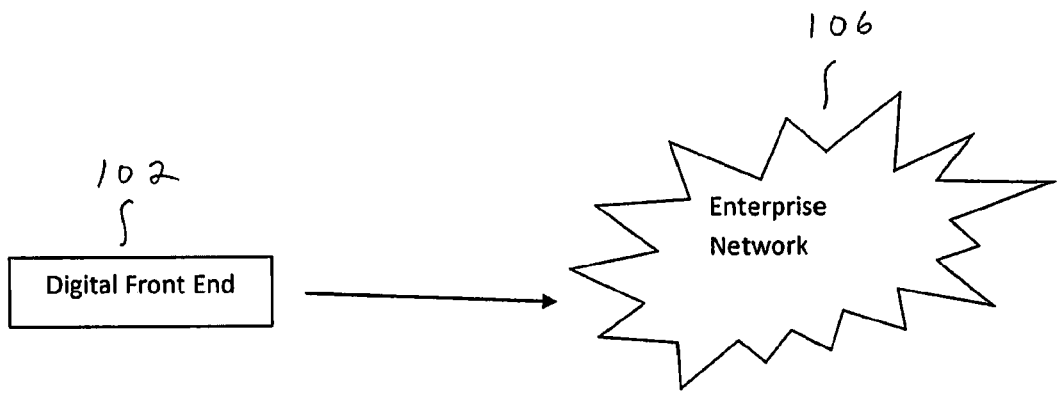
FIG. 4 is a schematic diagram showing the digital front end of FIG. 3 broadcasting for a unique identifier for the purposes of determining the IP address of the multi-function printer, according to an embodiment.

Thus, referring to FIG. 4, DFE 102 broadcasts for unique identifier 304.

3) Multifunction printers in the enterprise network respond with their respective unique identifiers to DFE 102.

Figure 5:
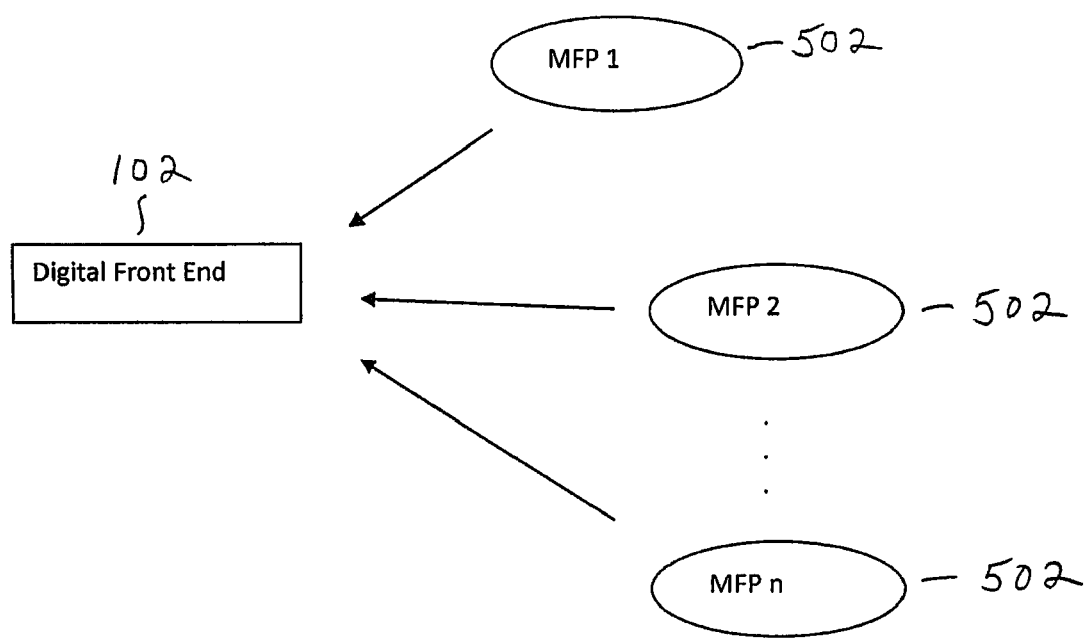
FIG. 5 is a schematic diagram showing the digital front end of FIG. 4 receiving the requested unique identifiers, each from a plurality of multi-function printers available on the network, according to an embodiment.

That is, referring to FIG. 5, multifunction printers 502 present in enterprise network 106 (not shown) respond with their respective unique identifiers to DFE 102.

4) (Not shown) DFE 102 matches unique identifier 304, which was stored and which had been previously received from proprietary data interface 302, with the unique identifiers received from multifunction printers 502 using network management protocol responses and determines, i.e. discovers, MFP 104 uniquely on enterprise network 106. Similarly, when no match is found, DFE 102 may determine that MFP 104 is not on enterprise network 106.

Determining the IP Address—An Embodiment

An embodiment uses the following steps to determine the IP address. Again, it should be appreciated that the particular details about printer technology are for illustrative purposes only and are not meant to be limiting. Indeed, the following applies to any two network devices that are in communication over a first interface and are each adapted to be in communication with an enterprise network, such as the Internet, Intranet, and so on.

1) Multifunction printer 104 is connected with data interface 302 such as but not limited to high speed serial link, parallel interface, fiber link, etc., to DFE 102.

2) DFE 102 and multifunction printer 104 are each connected to an electronic network 106 which supports any available broadcast based network management protocol.

3) DFE 102 obtains unique identifier 304 of multifunction printer 104 at the initial handshaking. It should be appreciated that multifunction printer 104 and DFE 102 may typically use proprietary protocols to establish communication. As well, for purposes of understanding herein, device handshaking, sometimes referred to as power on sequence, is a protocol in which multifunction devices acknowledge each ones presence and share some vital information such as but not limited to the capabilities and configuration of the device. Example capabilities of a multifunction printer may include but are not limited to a feeder or in-line finishing device connected. Example configurations may include but are not limited to details about toner levels, paper stock loaded, etc. Similarly, DFE 102 may expose its capabilities such as but not limited to supported page description language (PDL), e.g. Adobe® PostScript® by Adobe Systems Incorporated headquartered in San Jose, Calif.; printer command language (PCL); informational data such as but not limited to size of job queues; etc.

4) When proprietary interface 302 cannot be provided, unique identifier 304 may be entered in the configuration of DFE 102, such as by a user. For example, multifunction printer 104 and DFE 102 might each use electronic network 106 instead of a proprietary interface for print communication. As well, in such devices there may not be an interface with which to share a unique identifier. Thus, such information such as the unique identifier may be provided to DFE 102 using any input mechanism such as but not limited to a configuration user interface typically used to enter user preferences on DFE 102.

5) DFE 102 subsequently broadcasts requests to clients such as but not limited to multifunction printers 502. to provide their unique identifier such as for example, prtGeneralSerial. The prtGeneralSerial number is one example of a unique identifier which is defined in RFC 1759. Regarding multifunction printers, such unique identifier typically is supported by all multifunction printers and provides a way to uniquely identify a multifunction printer within the same model and manufacturer. It should be appreciated that in an embodiment, broadcast technology broadcasts a query to the enterprise network. All the devices connected to the enterprise network which are configured to respond to the broadcast query are referred to as clients. An example may be other multifunction printers or devices supporting the broadcast technology connected to the same enterprise network. Further, it should be appreciated that a multifunction printer serial number may be replaced by any other parameter provided by the broadcast based network management service and that is uniquely identifiable.

6) Clients 502 subsequently provide their unique identifiers back to DFE 102.

7) DFE 102 creates a list of such available clients 502 and subsequently matches the provided unique identifiers with unique identifier 304 that was provided by data interface 302 or by manual configuration by a user or other entity.

8) When DFE 102 determines a match has been found, DFE 102 establishes a connection with such multifunction printer of multifunction printers 502 which provided the correct unique identifier 304. Of course such multifunction printer of multifunction printers 502 for which a match was found is multifunction printer 104. As well, in addition to establishing a connection with multifunction printer 104 using the IP address of multifunction printer 104, DFE 102 may store such IP address for subsequent use.

9) DFE 102 may periodically broadcast for the unique identifier at such IP address to ensure that multifunction printer 104 is still present and connected. When DFE 102 does not get a response, in an embodiment, DFE 102 may send out another broadcast again.

An Example Implementation and Benefits Thereof

An example implementation, in accordance with embodiments here, is as follows. A customer buys or leases one or more digital printing products with controllers supporting a proprietary video interface. An embodiment uses the serial number provided by a multifunction printer through the proprietary link, i.e. the proprietary video interface, to do a SNMP broadcast and then obtain the IP address of the multifunction printer when the serial number of the device responding to the broadcast matches the one received via the proprietary link.

This will help manufacturer of the controllers to provide a solution to their customers where such customers can connect the controllers and the multifunction printer in any network configuration at the install time. Such customers do not need to bother about entering the IP address of the multifunction printer on the digital printing products with the controller or perform any manual steps, each of which are error prone.

It should be appreciated that by employing one or more embodiments herein, technical support cost for an enterprise is greatly reduced from present approaches where the end user does not understand the product/controller setup in order to support network configuration. Thus, approaches of embodiments herein may provide great benefits to large customer bases in enterprise markets because the IT representatives will not have to manage the cost of entering the IP address of the multifunction printer manually in the digital printing product/controller.

It further should be appreciated that embodiments herein help customers deploy their respective product/controller very quickly in an increasingly complex network environment and bring down input-output (10) management costs.

It further should be appreciated that embodiments herein facilitate an end user bringing in an external network device, e.g. an external controller, to enhance an environment which already has a network device, e.g. printers, with internal controllers. Presently, end users find that they are in a situation where they have to configure their devices for either the device with the internal controller or the external network device. However, embodiments herein allow end users to configure for and take advantage of both types of devices seamlessly.

Two Devices Continue to Work with Each Other Seamlessly, Despite Changes

Further, in accordance with embodiments herein, both types of devices discussed in the example above may change their IP addresses through such dynamic configuration. Presently, a technology does not exist where there are two devices sitting on the same network and they can identify using a secondary interface, because the secondary interface itself is proprietary. As well, embodiments herein ensure that both network devices are still exposed to the public network. Thus, in accordance with embodiments herein, a dynamic technique is provided such that network devices may identify themselves for example even in their Dynamic Host Controlled Protocol (DHCP) environments where their respective IP addresses may change constantly, i.e. are constantly variable. DHCP is a protocol commonly used in electronic networks where the IP addresses are dynamically assigned to active machines. Thus, one problem with such protocol, and addressed by embodiments herein, is that the IP address may change dynamically thus making it almost unusable for other devices to use IP addresses to communicate with such machines.

Put another way, embodiments herein allow, from an end user's perceptive, just taking these two devices, dropping them in a network, and letting the configuration figure itself out.

More Example Implementations

It should be appreciated that many other types of devices, broadcast protocols, and identifiers may be employed in accordance with embodiments described herein.

One example implementation includes a laptop with a projector. In this example, a cable connects from the VGA port off of the laptop to a RHDMA cable which connects to a projector. As well, in this example both the laptop and the projector have their own network IP addresses and are connected to the internet. Currently, there does not exist a way these two devices may each know the IP address of the other device, let alone independently. However, in an embodiment, one of the devices, e.g. the laptop, may obtain or have obtained instructions from a cloud service, where such instructions cause the laptop to receive from the projector a unique identifier of the projector, such as the serial number of the projector. Subsequent to receiving the projector's unique identifier, the laptop may broadcast over the electronic network in which laptop and projector are connected for the unique identifier. The projector may respond to the broadcast and the laptop receives the unique identifier from the laptop via the broadcast. Upon receiving one or more unique identifiers as a result of the broadcast, the laptop attempts to match the unique identifiers received via the broadcast with the one received over the cable. Upon finding a match, the laptop is then able to learn or obtain the IP address of the projector. It should be appreciated the particular details above are by way of example only and are not meant to be limiting. For example, it could be the projector that needs to obtain the IP address of the laptop. It could be that both devices have stored thereon in volatile or non-volatile memory instructions for performing all of the steps above with the goal of each obtaining the IP address of the other, and so on.

Another example implementation may be applicable in new-generation kitchens where end users have a microwave and a refrigerator, both of which are connected through a power line or a similar connection and both of which are connected to the internet but each appliance does not have a way to retrieve or learn the IP address from the other. Thus, embodiments herein ensure that by using a secondary interface which connects both of these types of devices, each device can find the network addresses of the other device.

Intelligence Location and Configuration May be Pushed or Pulled by a Device

It should be appreciated that the intelligence for causing any of the steps to occur is not dependent on location. The intelligence may be distributed over the devices, may reside on a server, or may be made available on the cloud, for example. For example, in the DFE, multifunction printer, and enterprise network environment, one embodiment stores the intelligence in the DFE. In another situation, the intelligence may reside on the device that may be the device that needs to know the IP address of the other device. For instance, in the projector and laptop case, it may be that the laptop needs to know the IP address of the projector so that it can send some files, but the projector does not care about the IP address of the laptop. Thus, in this situation, it may make sense from a design point of view to store the intelligence on the laptop.

As well, it should be appreciated that an embodiment is be designed such that the configuration is pushed or pulled by one device. Thus, given the device, which is going to be hosting the algorithm and the intelligence, from there an implementation can be determined with the protocol which dictates how the device gets configured. For example, a Blu-ray Disc™ device may be connected to an LCD, such as when both have network addresses, because each may go to the internet sitting on the cloud and talk to each other. As well, the Blu-ray Disc™ device and the LCD may be connected through a same router in a home network and connected through HDMI cable, through which they may share a unique identifier. Then, whichever device needs the IP addresses from the other may use the intelligence to pull IP address.

An Example Machine Overview

Figure 6:
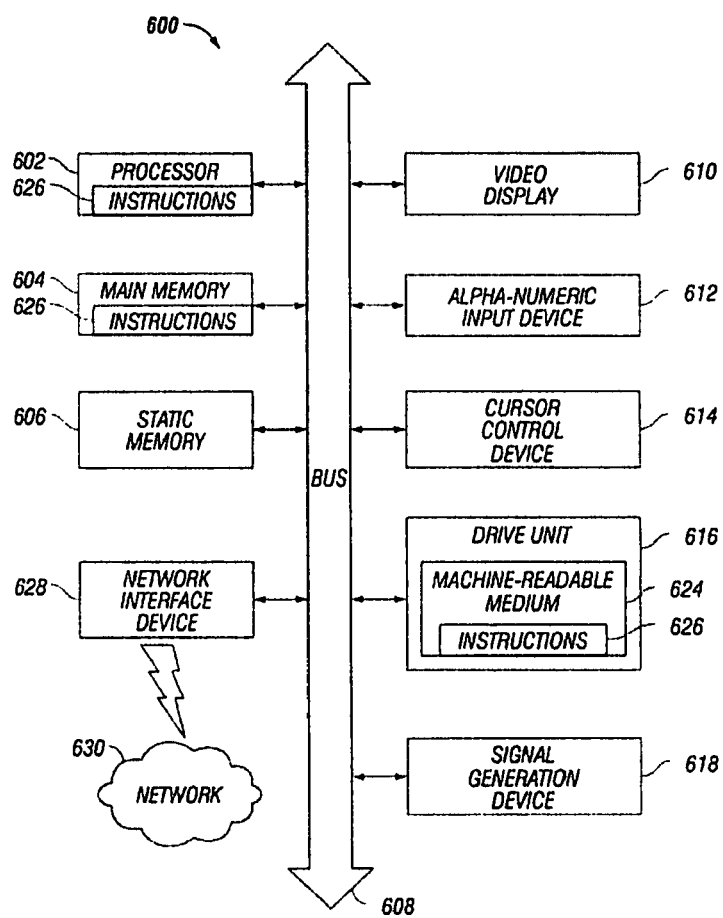
FIG. 6 is a block schematic diagram of a system in the exemplary form of a computer system according to an embodiment.

FIG. 6 is a block schematic diagram of a system in the exemplary form of a computer system 600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 600 includes a processor 602, a main memory 604 and a static memory 606, which communicate with each other via a bus 608. The computer system 600 may further include a display unit 610, for example, a liquid crystal display (LCD) or a cathode ray tube (CRT). The computer system 600 also includes an alphanumeric input device 612, for example, a keyboard; a cursor control device 614, for example, a mouse; a disk drive unit 616, a signal generation device 618, for example, a speaker, and a network interface device 620.

The disk drive unit 616 includes a machine-readable medium 624 on which is stored a set of executable instructions, i.e. software, 626 embodying any one, or all, of the methodologies described herein below. The software 626 is also shown to reside, completely or at least partially, within the main memory 604 and/or within the processor 602. The software 626 may further be transmitted or received over a network 630, by means of a network interface device 620.

In contrast to the system 600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for determining an IP address of a network device on an electronic network using broadcast technology, comprising:
    a first network device having a unique identifier communicably connecting, at an initial handshake, to a second network device via a proprietary or open interface, wherein said proprietary or open interface is not an IP network interface;
    during the initial handshake, said first network device transmitting once the unique identifier for delivery to the second network device through said proprietary or open interface, wherein the transmitted unique identifier enables:
        subsequent to said transmission, said second network device to broadcast a query request across said electronic network to any network device available on said electronic network and configured to respond to the broadcast query request, said query request requesting unique identifiers thereof;
        responsive to receiving said unique identifiers over said electronic network, matching said transmitted unique identifier received via said proprietary or open interface against said unique identifiers received over said electronic network responsive to said broadcast to determine a matching unique identifier;
        responsive to determining the matching identifier, obtaining an IP address of the network device having the matching identifier, which is the first network device; and
        responsive to obtaining the IP address of the first network device, the second network device establishing a connection with the first network device over the electronic network, using the IP address;
    wherein at least one of the steps is performed by a processor.

2. The computer-implemented method of claim 1, wherein the first network device or the second network device is any of: a multifunction printer, a digital printing press; a Digital Front End/External Print Controller (DFE), a laptop; a projector, and a streaming video player.

3. The computer-implemented method of claim 1, wherein a unique identifier is any of: a serial number, a combination of a serial number and make/model, and a MAC address.

4. The computer-implemented method of claim 1, wherein an electronic network is any of: an internet and an intranet.

5. The computer-implemented method of claim 1, wherein said proprietary or open interface is any of: a data interface, an HDMI cable, a high-speed serial cable, and a printer cable.

6. The computer-implemented method of claim 1, wherein said broadcasting comprises any of: simple network management protocol (SNMP); Web Services on Devices (WSD) discovery, and any proprietary discovery protocol which responds with the unique identifier.

7. The computer-implemented method of claim 1, wherein said first network device has a connection established over said electronic network with and by said second network device responsive to said second network device obtaining an IP address of the network device having the matching identifier, which is the first network device.

8. A computer-implemented method for determining an IP address of a network device on an electronic network using broadcast technology, comprising:
    a second network device communicably connecting, at an initial handshake, to a first network device having a unique identifier via a proprietary or open interface, wherein said proprietary or open interface is not an IP network interface;
    during the initial handshake, receiving, by said second network, the the unique identifier transmitted once through said proprietary or open interface;
    subsequent to said transmission, said second network device broadcasting a query request across said electronic network to any network device available on said electronic network and configured to respond to the broadcast query request, said query request requesting unique identifiers thereof;
    responsive to receiving said unique identifiers over said electronic network, matching said unique identifier received via said proprietary or open interface against said unique identifiers received over said electronic network to determine a matching unique identifier;
    responsive to determining the matching identifier, obtaining an IP address of the network device having the matching identifier, which is the first network device; and
    responsive to obtaining the IP address of the first network device, the second network device establishing a connection with the first network device over the electronic network, using the IP address;
    wherein at least one of the steps is performed by a processor.

9. The computer-implemented method of claim 8, wherein the first network device or the second network device is any of: a multifunction printer, a digital printing press; a Digital Front End/External Print Controller (DFE), a laptop; a projector, and a streaming video player.

10. The computer-implemented method of claim 8, wherein a unique identifier is any of: a serial number, a combination of a serial number and make/model, and a MAC address.

11. The computer-implemented method of claim 8, wherein an electronic network is any of: an internet and an intranet.

12. The computer-implemented method of claim 8, wherein said proprietary or open interface is any of: a data interface, an HDMI cable, a high-speed serial cable, and a printer cable.

13. The computer-implemented method of claim 8, wherein said broadcasting comprises any of: simple network management protocol (SNMP); Web Services on Devices (WSD) discovery, and any proprietary discovery protocol which responds with the unique identifier.

14. The computer-implemented method of claim 8, further comprising:
said first network device being connected to said second network device over said electronic network, responsive to said second network device obtaining an IP address of the network device having the matching identifier, which is the first network device.

15. The computer-implemented method of claim 8, wherein said unique identifier is entered into said configuration of said second network device subsequent to being passed from said first network device to said second network device through said proprietary or open interface.

16. The computer-implemented method of claim 8, further comprising:
dynamically broadcasting, by said second network device, across said electronic network to any network device available on said electronic network for unique identifiers thereof in response to said proprietary or open interface being reconnected at a later point in time.

17. The computer-implemented method of claim 8, wherein said second network device periodically broadcasts for said unique identifier on said electronic network to detect whether said first network device is still present and connected on said electronic network.

18. The computer-implemented method of claim 17, wherein when said first network has a different IP address and when said second network device does not receive said unique identifier in response to a periodic broadcast, then said second network device sending out a subsequent broadcast across said electronic network to any network device available on said electronic network for unique identifiers thereof, thereby obtaining said different IP address of said first network device.

19. A non-transitory computer readable medium having stored thereon a computer program for determining an IP address of a network device on an electronic network using broadcast technology, said computer program comprising a program code which, when executed by a processor, performs the steps of:
a first network device having a unique identifier communicably connecting, at an initial handshake, to a second network device via a proprietary or open interface, wherein said proprietary or open interface is not an IP network interface;
during the initial handshake, said first network device transmitting once the unique identifier for delivery to the second network device through said proprietary or open interface, wherein the transmitted unique identifier enables:
subsequent to said transmission, said second network device to broadcast a query request across said electronic network to any network device available on said electronic network and configured to respond to the broadcast query request, said query request requesting unique identifiers thereof;
responsive to receiving said unique identifiers over said electronic network, matching said transmitted unique identifier received via said proprietary or open interface against said unique identifiers received over said electronic network responsive to said broadcast to determine a matching unique identifier;
responsive to determining the matching identifier, obtaining an IP address of the network device having the matching identifier, which is the first network device; and
responsive to obtaining the IP address of the first network device, the second network device establishing a connection with the first network device over the electronic network, using the IP address.

20. A non-transitory computer readable medium having stored thereon a computer program for determining an IP address of a network device on an electronic network using broadcast technology, said computer program comprising a program code which, when executed by a processor, performs the steps of:
a second network device communicably connecting, at an initial handshake, to a first network device having a unique identifier via a proprietary or open interface, wherein said proprietary or open interface is not an IP network interface;
during the initial handshake, receiving, by said second network, the the unique identifier transmitted once through said proprietary or open interface;
subsequent to said transmission, said second network device broadcasting a query request across said electronic network to any network device available on said electronic network and configured to respond to the broadcast query request, said query request requesting unique identifiers thereof;
responsive to receiving said unique identifiers over said electronic network, matching said unique identifier received via said proprietary or open interface against said unique identifiers received over said electronic network to determine a matching unique identifier;
responsive to determining the matching identifier, obtaining an IP address of the network device having the matching identifier, which is the first network device; and
responsive to obtaining the IP address of the first network device, the second network device establishing a connection with the first network device over the electronic network, using the IP address.

\* \* \* \* \*